A. R. KOEHLER.
TRIMMING MACHINE.
APPLICATION FILED OCT. 28, 1914.
1,227,155.
Patented May 22, 1917.
2 SHEETS—SHEET 1.
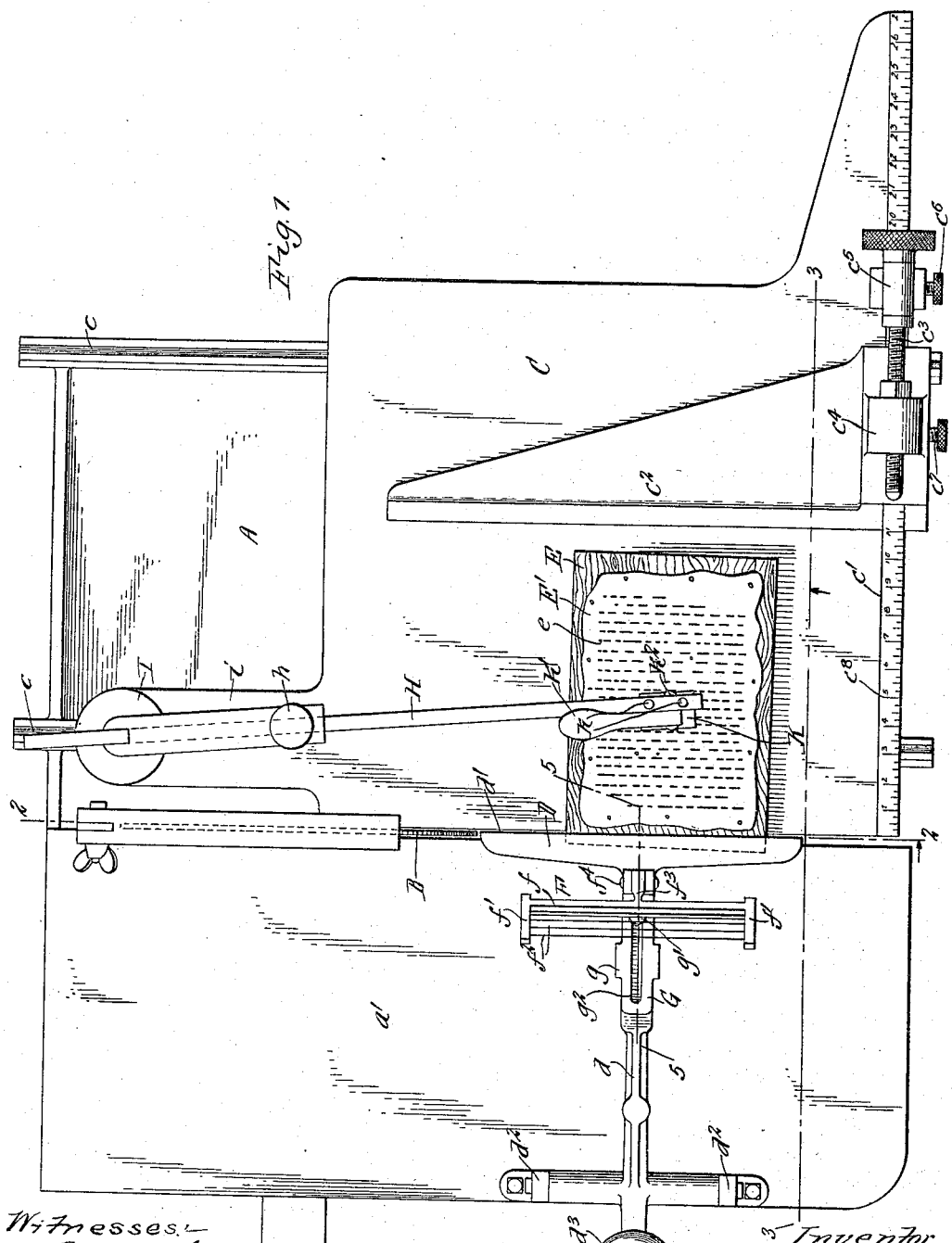

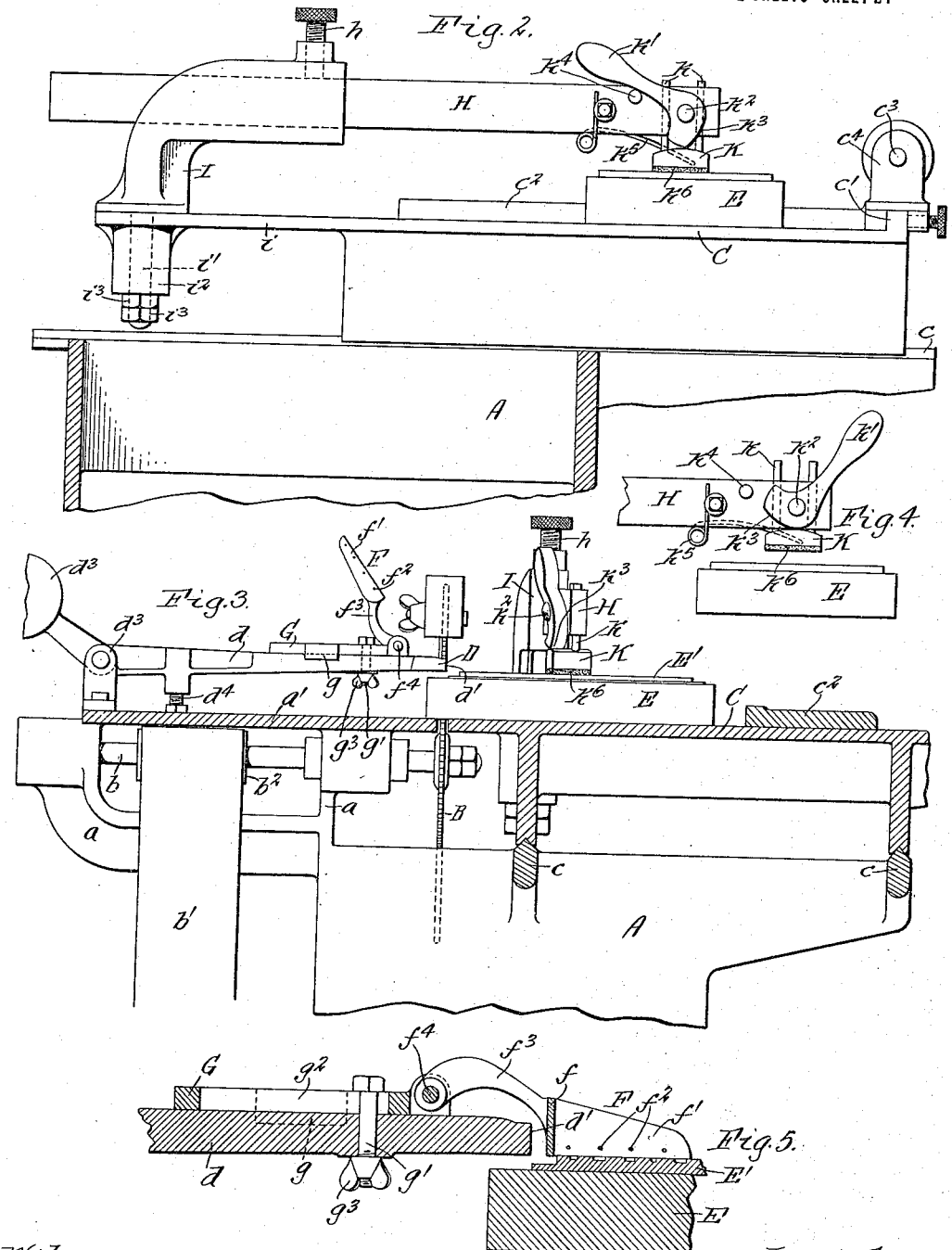

UNITED STATES PATENT OFFICE.

ANDREW R. KOEHLER, OF BUFFALO, NEW YORK.

TRIMMING-MACHINE.

1,227,155.   Specification of Letters Patent.   Patented May 22, 1917.

Application filed October 28, 1914. Serial No. 869,061.

*To all whom it may concern:*

Be it known that I, ANDREW R. KOEHLER, a citizen of the United States, residing at Buffalo, in the county of Erie and State of New York, have invented a new and useful Improvement in Trimming-Machines, of which the following is a specification.

This invention relates to machines for trimming or cutting blocks, such as electrotype blocks, and which comprise a cutter adapted to trim the edges of the blocks, and a movable table on which the blocks are held and which moves past the cutter to subject the edges of the blocks to the action thereof.

The object of this invention is to provide a machine of this kind with a gage by means of which the block can be readily placed on the movable table in such a position that the cutter will trim an edge thereof in proper relation to a line on the electrotype.

In the accompanying drawings:

Figure 1 is a top plan view of a machine embodying the invention.

Fig. 2 is a longitudinal sectional elevation thereof on line 2—2, Fig. 1.

Fig. 3 is a fragmentary transverse sectional elevation thereof on line 3—3, Fig. 1.

Fig. 4 is a fragmentary elevation of the end of the clamping or holding member, showing the same in position over a block.

Fig. 5 is a fragmentary sectional elevation on line 5—5, Fig. 1, showing in a different position the gage for positioning the blocks.

A represents the frame of the machine which may be of any suitable or desired construction, that shown having projections or brackets $a$ at one side thereof which support a stationary table or plate $a'$ and which are provided with suitable bearings for a shaft $b$ on which the saw or other suitable cutter B is mounted. The shaft may be driven by any suitable means, as, for example, by a belt $b'$ running over a pulley $b^2$ on the shaft. The frame A is provided with tracks or guide rails $c$ extending lengthwise of the machine and on which a movable work supporting or feed table C is adapted to reciprocate to carry the work on the table into and out of operative relation to the cutter. One edge of the feed table moves past the cutter in close proximity thereto and the work or block to be cut is so placed on the table that the part to be cut off projects over this edge of the table. The table in the machine shown is adapted to be pushed toward the back of the machine by the operator for feeding the work to the cutter, and is provided with the usual means for properly squaring or alining the work relatively to the cutter including a straight edge consisting of an upwardly projecting flange $c'$ formed on the front end of the movable table and extending perpendicularly to the direction of movement thereof and a square $c^2$ slidably mounted on the flange $c'$ and movable lengthwise thereon. In order to effect a precise adjustment of the square, an adjusting screw $c^3$ is provided which engages in a threaded part $c^4$ of the square $c^2$ and which is arranged to turn but is held from endwise movement in a bearing $c^5$. The bearing $c^5$ is also slidably mounted on the flange $c'$ and moves with the square when the adjusting screw is not in use, and can be locked on the flange by a set screw $c^6$, or other means, when it is intended to use the adjusting screw for moving the square toward or from the bearing member $c^5$. The square can be locked in adjusted position by any suitable means, such as a set screw $c^7$. The flange $c'$ may be provided with a scale $c^8$ for adjusting the square so as to cut the block to any desired dimension. A square or straight edge of any other suitable construction may be provided if desired.

The machine is also provided with the usual gage for positioning the block at the proper distance from the saw. This gage, in the construction shown, is mounted on the fixed table $a'$ in front of the cutter, and preferably consists of an arm $d$ having a transversely extending edge gage member D, the outer edge $d'$ of which is on a line with that portion of the cutter which is nearest to the block, so that the gage when placed over a block on the feed table indicates the line which will form the edge of the block after the same has been trimmed by the cutter. The arm $d$ is preferably pivoted in brackets $d^2$ on the fixed table and is counterbalanced by a weight $d^3$ so that the arm can be swung upwardly out of the way when not in use. $d^4$ indicates a set screw or stop on the underside of the arm $d$ which is adapted to rest on the table $a'$ and which is adjustable to control the distance of the gage member D above the block.

The electrotype blocks to be trimmed each comprise a base E usually of wood, and an electrotype plate E' suitably secured to the wooden base. e represents lines of type or other matter to be printed.

All of these parts are common in electrotype trimming machines and may be of any suitable construction.

Trimming machines equipped with an edge gage as above described are quite satisfactory when the electrotype to be trimmed has a border, a line of type or other straight line parallel and in close proximity to the edge thereof, since the block could then be readily so placed on the feed table as to arrange the border line or line of type parallel with the edge $d'$ of the edge gage. Many electrotypes are, however, not provided with a straight line near the edges thereof. It is therefore necessary to make a mark or line on the edge of the electrotype, which can be alined with the edge gage D, and this requires considerable time. A paralleling gage is therefore provided by means of which the block can be alined with any straight line of the type plate. This gage is preferably constructed as follows:

F represents a frame comprising a body portion $f$ and arms $f'$ extending outwardly therefrom. A plurality of parallel cords, wires or the like $f^2$ are stretched between the arms $f'$ at short intervals, each of the cords being parallel to the line along which the cutter trims the block. The frame has a rigid arm $f^3$ pivoted at $f^4$ to a slide G, mounted on the arm $d$ of the edge gage, and is adapted to swing on its pivot to a position over the block when it is desired to use the paralleling gage. By providing a plurality of parallel wires or cords, one or another of the cords will come sufficiently near a line of type on the electrotype to enable the block to be placed in a position in which the line of type will be parallel with one of the cords, and consequently parallel with the line along which the block is to be trimmed. When not in use the paralleling gage can be swung back into a position shown in Fig. 3.

The slide G is so mounted on the arm $d$ as to enable the paralleling gage to be moved to different distances over the type block and to keep the cords of the gage at all times parallel to the cutting line. For this purpose the slide is provided with depending side flanges $g$ engaging the sides of the arm $d$ and confining the movement of the slide so as to keep the cords $f^2$ at all times parallel to the cutting line. The slide may be locked in any desired position by means of a bolt $g'$ passing through a hole in the arm $d$ and through a slot $g^2$ in the slide, the bolt being tightened by a nut $g^3$.

In the paralleling gage described, the parallel cords have been found very satisfactory since they require no adjusting of the gage relatively to a line of type, one or another of the cords being generally near enough to the line of type to enable the block to be positioned. The slide G may, if desired, be constructed in any other suitable manner, or it may be entirely omitted, if desired, in which case the paralleling gage may be pivoted on the arm $d$, and a paralleling gage of other construction bearing the separate parallel wires or the like could also be used, for example a gage having parallel slots through which a line of type could be seen.

In the operation of the machine the paralleling gage is used for positioning the block to cut one edge thereof. After one edge of the block has been cut, the other edges thereof can be trimmed in the usual manner, by placing the trimmed edge against the straight edge $c'$ or against the square $c^2$, the edge gage D being used as described for positioning the edge relatively to the cutter. When it is desired to trim the block to a desired size the square can be set according to a scale $c^8$ on the flange $c'$.

Means are preferably provided which can be readily operated to clamp the block securely on the feed table when the table is moved toward the cutter. These means include an arm or rod H which is pivotally mounted on the feed table to swing over the same and is provided with a clamping or holding member for securely holding the work on the feed table, the arm being also movable toward and from its pivot. In the construction shown for this purpose, a bracket I is pivoted on the feed table, preferably on a rigid rearward projection $i$ thereof. The bracket has a downwardly extending pivot pin $i'$ which enters a hole in boss $i^2$ formed in the projection $i$ and which is held in the boss by nuts $i^3$ $i^3$. This pivot permits the bracket I to swing in a plane parallel to the face of the feed table. The bracket has a substantially horizontal guide hole or bearing in which the arm H is slidable endwise and is held from rotation by any suitable means, for example, the hole in the bracket, and the arm may be made rectangular in cross-section. The outer end of the arm H can consequently be swung about the bearing of the bracket I and can also be moved toward or from the bearing, so that this end of the arm can be placed over any part of the feed table. If desired, the arm H may be held from endwise movement in the bracket I by means of a set screw $h$. Any suitable means may be provided at the outer end of this arm for clamping the electrotype block on the feed table, that shown in the drawings being constructed as follows:

A presser foot K is slidably mounted on the end of the arm I to move up and down relatively to the feed table, being provided with pins $k$ $k$ extending through holes in the arm I for guiding the presser foot in its movement. The presser foot is moved into engagement with the block by means of a cam lever $k'$ pivoted at $k^2$ to the arm I and having a cam face $k^3$ adapted to engage the presser foot to move the same downwardly. A pin $k^4$ limits the movement of the cam lever in the direction to cause the presser foot to engage the block. The cam face is so shaped that the lever will engage the pin just after passing the dead center position, so that the lever will be held in this position. A spring $k^5$ holds the presser foot normally in its upper position, as shown in Fig. 4. The presser foot is provided with a suitable elastic pad $k^6$ which protects the face of the electrotype against injury and which also compensates for any slight variation which may exist in the thickness of the electrotype blocks.

The means described for holding the blocks on the feed table can be easily operated, it being only necessary to bring the end of the arm H over the block and then to move the cam lever to its operative position. The holding means avoid the necessity of the block being held by hand and consequently lessens the chances of injury from the cutter.

I claim as my invention:

1. The combination in a trimming machine having a cutter and a table on which the work can be held and which is movable relatively to the cutter, of a gage in operative relation to said table for indicating the line on which the work is to be cut, and a second gage adapted to extend over the work beyond the line of cut and having a part with which the work can be alined to position the same in the desired relation to the first mentioned gage.

2. The combination in a trimming machine having a cutter and a work supporting table, of a gage in operative relation to said table for indicating the line on which the cutter operates, and a gage adapted to extend over the work beyond the line of cut and having a part with which the work can be alined to position the same in the desired relation to the cutter, said gages being mounted to be moved together into and out of operative relation to the work.

3. The combination in a trimming machine having a cutter and a work supporting table, of a gage having a part adapted to extend over the work beyond the line of cut and with which the work can be alined to position the same in the desired relation to the cutter.

4. The combination in a trimming machine having a cutter and a work supporting table, of a gage adapted to be placed over said table and having a plurality of members arranged at intervals with open spaces between the members through which the work can be seen and extending parallel to the line on which said cutter operates.

5. The combination in a trimming machine having a cutter and a work supporting table, of a gage adapted to be placed over said table and to be moved out of operative relation to the table and having a plurality of members spaced at intervals and extending parallel to the line on which said cutter operates, said gage being slidably mounted on the machine and adapted to move over said table so that said spaced members remain parallel to the line of cut.

6. The combination in a trimming machine having a cutter and a work supporting table, of a gage in operative relation to said table for indicating the line on which the cutter operates, and a second gage mounted on said first gage and movable over the work beyond the line of cut, said second gage having a part with which the work can be alined to position the same in the desired relation to the cutter.

7. The combination in a trimming machine having a cutter and a work supporting table, of a gage adapted to be placed over said table and having a part extending parallel to the line on which said cutter operates, said gage being slidably mounted on the machine and adapted to move over said table so that said part remains parallel to the line of cut.

Witness my hand, this 27th day of October, 1914.

ANDREW R. KOEHLER.

Witnesses:
F. E. PROCHNOW,
C. HORNBECK.